(12) United States Patent
Chen et al.

(10) Patent No.: US 8,459,126 B2
(45) Date of Patent: Jun. 11, 2013

(54) TESTING APPARATUS

(75) Inventors: Fang-Yuan Chen, Shenzhen (CN); Shu-Qi Wu, Shenzhen (CN); Yang Chen, Shenzhen (CN); Yu-Lin Liu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 186 days.

(21) Appl. No.: 13/091,998

(22) Filed: Apr. 21, 2011

(65) Prior Publication Data

US 2012/0067141 A1    Mar. 22, 2012

(30) Foreign Application Priority Data

Sep. 21, 2010    (CN) .......................... 2010 1 0288808

(51) Int. Cl.
*G01N 3/22*    (2006.01)
*G01N 3/02*    (2006.01)

(52) U.S. Cl.
USPC .................................. 73/856; 73/857; 73/847

(58) Field of Classification Search
USPC .......................... 73/761, 847–854, 814, 856
See application file for complete search history.

(56) References Cited

U.S. PATENT DOCUMENTS

| 2,030,464 | A  | * | 2/1936  | Nilson ............................ | 73/761 |
| 4,866,990 | A  | * | 9/1989  | Peterson et al. ................. | 73/761 |
| 5,184,517 | A  | * | 2/1993  | Kelzer ............................ | 73/851 |
| 5,447,072 | A  | * | 9/1995  | Holung .......................... | 73/848 |
| 5,567,884 | A  | * | 10/1996 | Dickinson et al. ............... | 73/814 |
| 6,067,860 | A  | * | 5/2000  | Grams et al. .................... | 73/814 |
| 6,289,743 | B1 | * | 9/2001  | Norton ............................ | 73/847 |
| 7,281,438 | B2 | * | 10/2007 | Searle ......................... | 73/862.26 |
| 2012/0132016 | A1 | * | 5/2012 | Chen et al. .................... | 73/865.9 |

* cited by examiner

*Primary Examiner* — Lisa Caputo
*Assistant Examiner* — Jonathan Dunlap
(74) *Attorney, Agent, or Firm* — Altis Law Group, Inc.

(57) ABSTRACT

A testing apparatus includes a support mechanism, a pushing device and a clamping device. The pushing device includes a guiding member, a driving member moveably attached to the guiding member, and a resilient component located between the guiding member and the guiding member. The clamping device is attached to the driving member, and secures a product. The driving member and the clamping device deforms the resilient component in a first direction, and the resilient component biases the driving member and the clamping device in a second direction, that is opposite to the first direction.

20 Claims, 5 Drawing Sheets

TESTING APPARATUS

BACKGROUND

1. Technical Field

The present disclosure relates to a testing apparatus.

2. Description of Related Art

A product, such as a hard disk, is often electrically connected to an interface of an electronic device. The connection of the product and the interface of the electronic device should be tested to ensure reliability. The testing is usually done manually, which is labor intensive and time-consuming.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
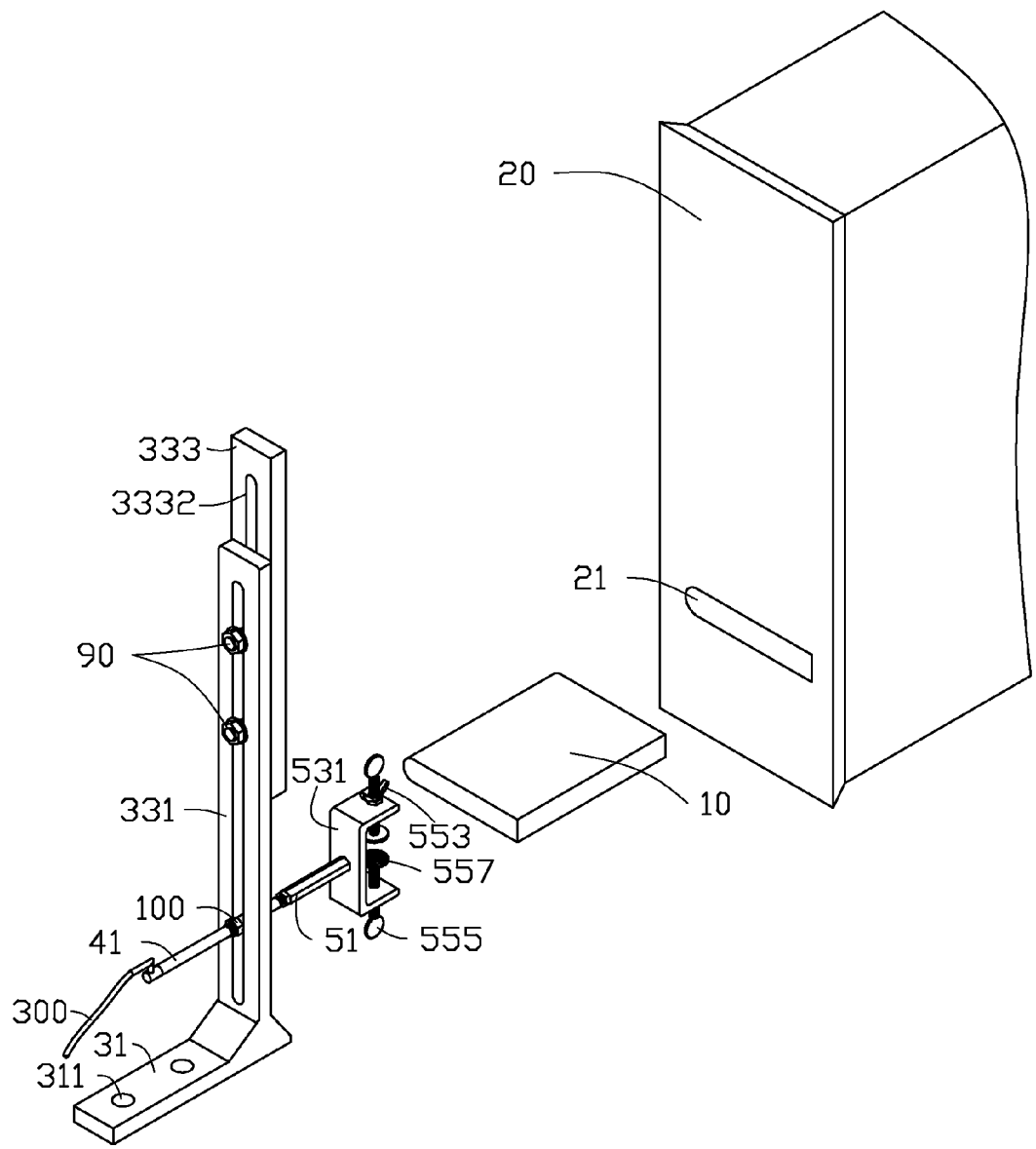
FIG. 1 is an exploded, isometric view of a testing apparatus and an electronic device in accordance with an embodiment.
Figure 2:
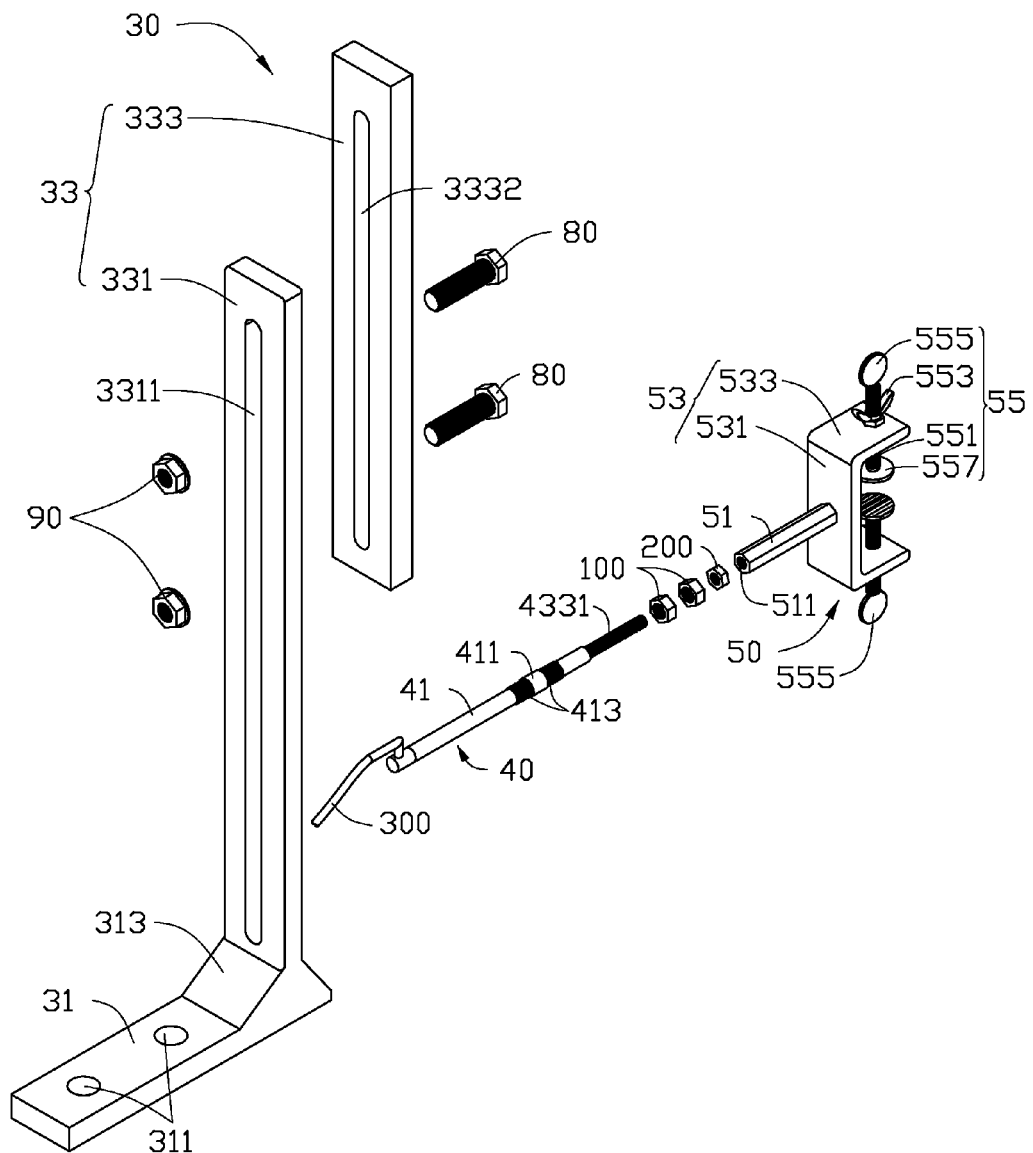
FIG. 2 is an exploded, isometric view of a testing apparatus in accordance with an embodiment.

Referring to FIGS. 1 and 2, a testing apparatus in accordance with an embodiment includes a support mechanism 30, a pushing device 40 secured to the support mechanism 30, and a clamping device 50 mounted to the pushing device 40. A product 10, whose interfaces is engaged in or disengaged from an interface 21 of an electronic device 20, is tested by the testing apparatus. In one embodiment, the product 10 may be, for example, a hard disk, or a CD drive, and the electronic device 20 may be a computer.

The support mechanism 30 includes a base 31 and a securing member 33 connected to the base 31. Two base holes 311 are defined in the base 31. Two fixing members (not shown), such as screws, are engaged in the base holes 311 to secure the base 31 to a support surface (not shown), such as a surface of a desk. A connecting portion 313 is located at an end of the base 31. The securing member 33 includes a main securing plate 331 with a longitudinal securing hole 3311, and an assistant securing plate 333 with a longitudinal mounting hole 3332. The mounting hole 3332 is aligned with the securing hole 3311. One of ordinary skill in the art will also realize that the present disclosure is not limited to the configuration of the securing member 33. Rather, other configurations are contemplated by the present disclosure, for example, a slide-rail.

Figure 3:
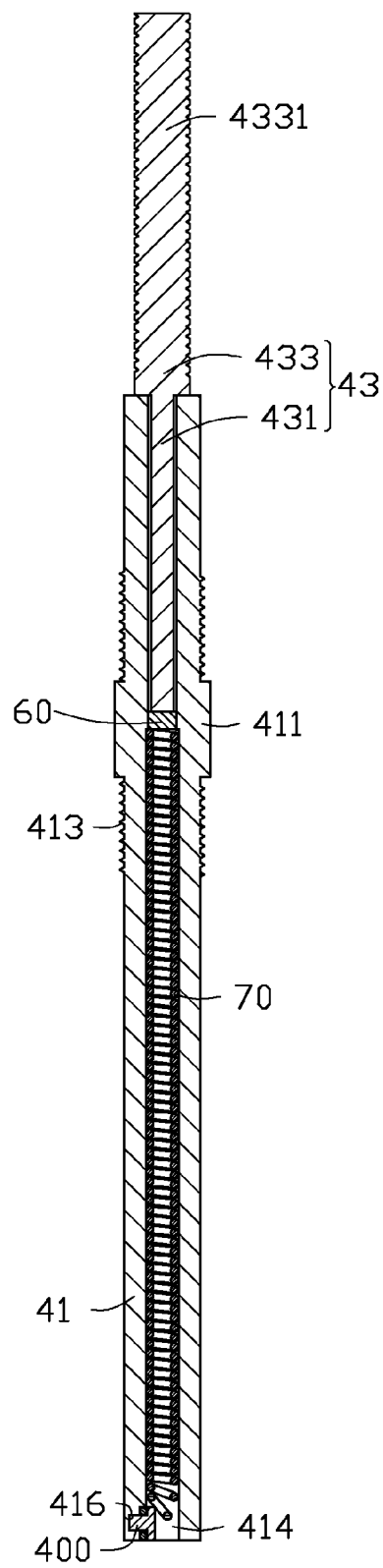
FIG. 3 is a cross-section view of a pushing device of the testing apparatus of FIG. 2.

Referring to FIGS. 2 and 3, the pushing device 40 includes a guiding member 41 and a driving member 43 being moveably received in the guiding member 41. A protrusion 411 protrudes from the guiding member 41, and two retaining portions 413 with threads are located on two opposite sides of the protrusion 411. The retaining portions 413 are secured to the main securing plate 331 or the assistant securing plate 333. A through hole 414 is defined by the guiding member 41 in a longitudinal direction, and a thread hole 416 is defined in inner surface of the through hole 414 at one end of the guiding member 41. A stopper piece 60 and a resilient component 70 are received in the through hole 414. A first end of the resilient component 70 abuts the stopper piece 60. The driving member 43 includes a connecting pole 431 received in the through hole 414, and a fixing pole 433 connected to the connecting pole 431. The connecting pole 431 is secured to the stopper piece 60. An outer thread 4331 is defined in the fixing pole 433. In one embodiment, a diameter of the connecting pole 431 is less than that of the fixing pole 433.

Referring to FIG. 2, the clamping device 50 includes a mounting shaft 51 with a screw hole 511, a positioning member 53 connected to the mounting shaft 51, and two adjusting members 55 mounted to the positioning member 53. The positioning member 53 includes a mounting panel 531 connected to the mounting shaft 51, and two side panels 533 connected to opposite edges of the mounting panel 531. In one embodiment, the mounting panel 531 is substantially perpendicular to the mounting shaft 51, and the positioning member 53 is U-shaped. One of ordinary skill in the art will also realize that the present disclosure is not limited to the configuration of the positioning member 53. Rather, other configurations are contemplated by the present disclosure; for example, the mounting panel 531 can be at an angle to the mounting shaft 51.

Each adjusting member 55 includes a installation post 551 passing through a hole defined in the side panel 533, a tightening portion 553, an operating portion 555 attached to a top end of the installation post 551, and a clamping portion 557 attached to a bottom end of the installation post 551. In one embodiment, the installation post 551 is threaded, the tightening portion 553 is located on a top surface of the side panel, and the clamping portion 557 is round.

Figure 4:
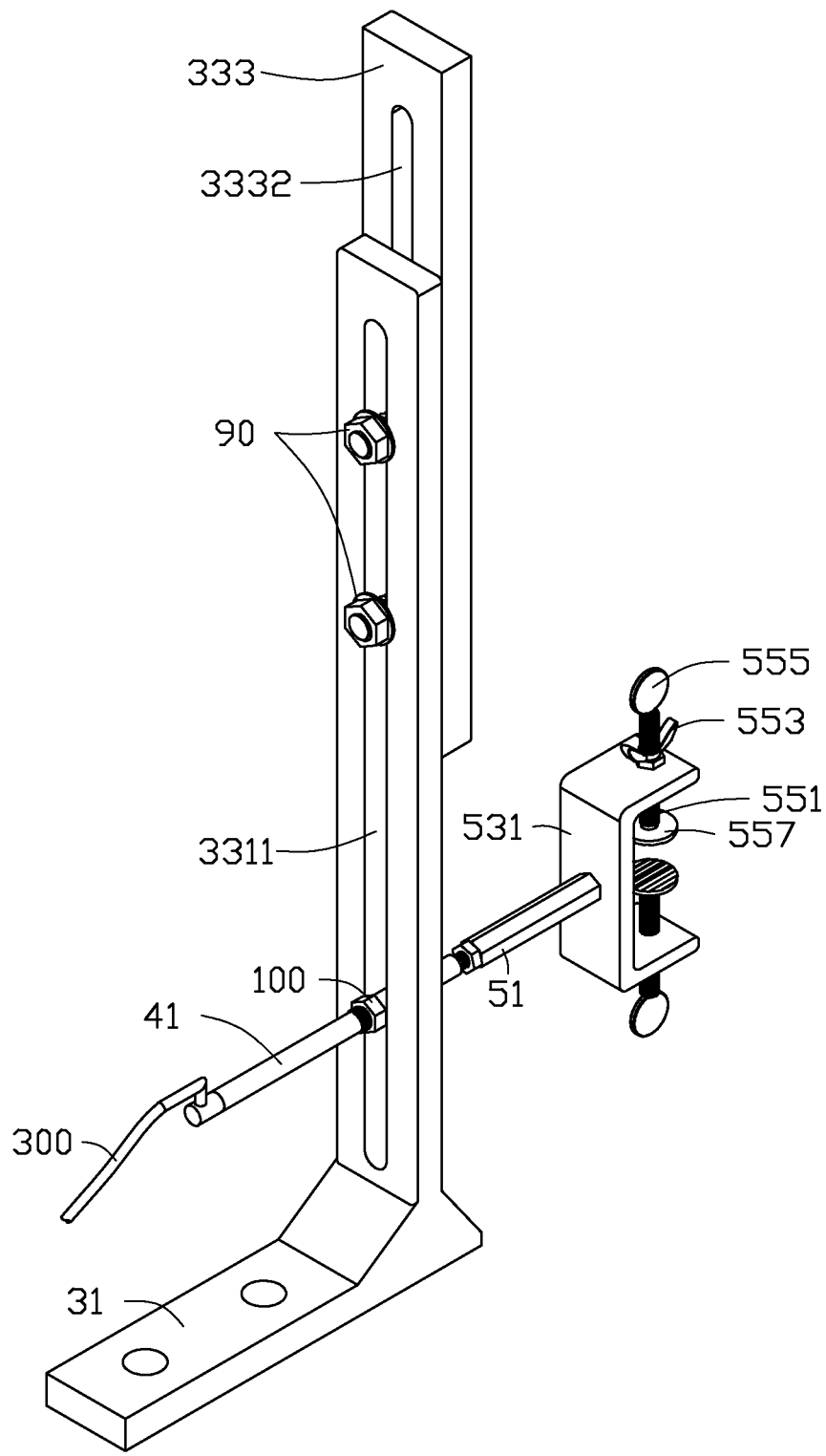
FIG. 4 is an assembled view of FIG. 2.

Referring to FIGS. 3 and 4, in assembly, the assistant securing plate 333 abuts the main securing plate 331, with the mounting hole 3332 aligned with the securing hole 3311. Two fasteners 80 are passed through the mounting hole 3332 and the securing hole 3311, and two first nuts 90 are engaged with the two fasteners 80. The assistant securing plate 333 is thereby secured to the main securing plate 331.

The guiding member 41 of the pushing device 40 is passed through the securing hole 3311, with the protrusion 411 abutting the main securing plate 331. Two second nuts 100 are engaged with the two retaining portions 413, and the guiding member 41 is thereby mounted to the main securing plate 331. The stopper piece 60 is secured to the resilient component 70 and the connecting pole 431 by well known methods, for example, jointing or plaster. The resilient component 70, the stopper piece 60 and the connecting pole 431 are received in the through hole 414, and a free end of the resilient component 70 is enlaced on a locking component 400 with an outer thread. Then, the locking component 400 is engaged in the thread hole 416, to secure the resilient component 70 to the guiding member 41. The fixing pole 433 is inserted into the screw hole 511, and a third nut 200 engaged with the fixing pole 433, so that the fixing pole 433 is mounted to the mounting shaft 51. At this point the resilient component 70 is in an original state.

Figure 5:
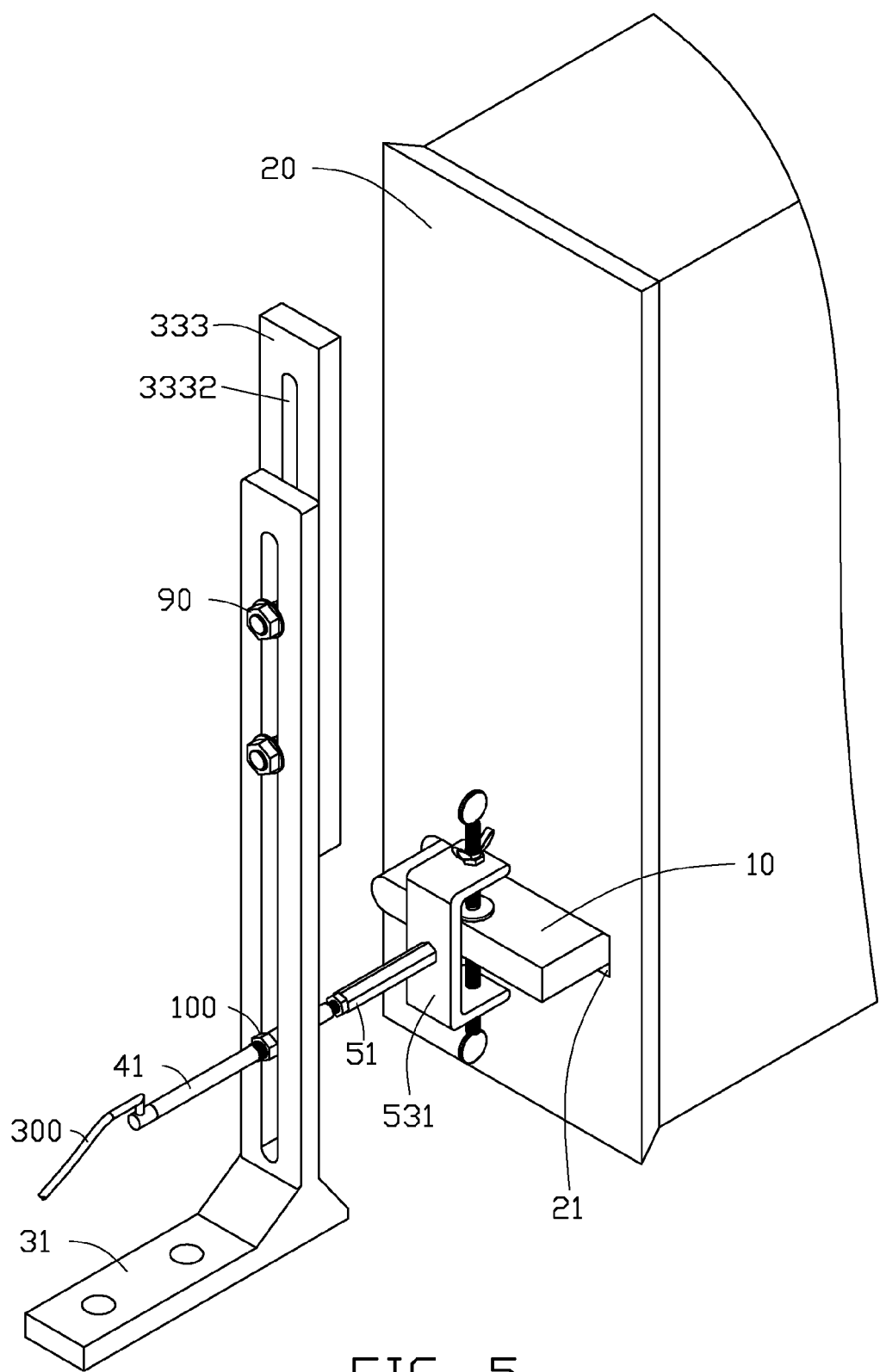
FIG. 5 is an assembled, cutaway view of FIG. 1.

Referring to FIG. 5, in testing, the two operating portions 555 of the adjusting member 55 are loosed, for each clamping portion 557 moving away from another, until a distance between the two clamping portions 557 is greater than a thickness of the product 10. The product 10 is located between the two clamping portions 557. The two operating portions 555 are tightened, for each clamping portion 557 to move toward to each other. Each tightening portion 553 is rotated to prevent the installation post 551 from rotating or moving, until the product 10 is tightly sandwiched between the two clamping portions 557.

A guiding pipe 300 is attached to an end of the guiding member 41, and the guiding pipe 300 communicates with the through hole 414. The product 10 is aligned with the interface 21 of the electronic device 20. Air is filled in the through hole 414, and power is applied to slide the stopper piece 60 in a direction towards the interface 21. The driving member 43 and the clamping device 50 are moved towards the interface 21, until the product 10 is inserted into the interface 21, and the resilient component 70 is elastically deformed by the stopper piece 60.

When the power applied to the stopper piece 60 is removed. The resilient component 70 rebounds to slide the stopper piece 60 in a direction away from the interface 21. The stopper piece 60 pulls the driving member 43 and the clamping device 50 to move away from the interface 21. Therefore, the product 10 is disengaged from the interface 21 of the electronic device 20.

The abovementioned testing steps are repeated, and a testing result will be obtained.

In addition, if the interface 21 is above the main securing plate 331, the pushing device 40 and the clamping device 50 can be secured to the assistant securing plate 333.

It is to be understood, however, that even though numerous characteristics and advantages have been set forth in the foregoing description of embodiments, together with details of the structures and functions of the embodiments, the disclosure is illustrative only and changes may be made in detail, especially in matters of shape, size, and arrangement of parts within the principles of the disclosure to the full extent indicated by the broad general meaning of the terms in which the appended claims are expressed.

What is claimed is:

1. A testing apparatus comprising:
    a support mechanism;
    a pushing device comprising a guiding member, a driving member moveably attached to the guiding member, and a resilient component located between the guiding member and the driving member; and
    a clamping device, attached to the driving member, configured for securing a product;
    a guiding pipe attached to the pushing device;
    wherein the guiding pipe is configured to direct air into the pushing device, for moving the driving member and the clamping device to deform the resilient component in a first direction, and when the air of the pushing device escapes, the resilient component biases the driving member and the clamping device in a second direction, that is opposite to the first direction.

2. The testing apparatus of claim 1, wherein the clamping device comprises a mounting shaft, and the driving member comprises a fixing pole engaged with the mounting shaft.

3. The testing apparatus of claim 2, wherein the driving member further comprises a connecting pole connected to the fixing pole, and a stopper piece secured to the connecting pole and the resilient component.

4. The testing apparatus of claim 3, wherein a diameter of the fixing pole is greater than that of the connecting pole.

5. The testing apparatus of claim 3, wherein the guiding member defines a through hole, and the resilient component and the connecting pole are received in the through hole.

6. The testing apparatus of claim 2, wherein the clamping device further comprises a positioning member connected to the mounting shaft, the positioning member comprises two side panels, and an adjusting member is moveably attached to each side panel.

7. The testing apparatus of claim 6, wherein the adjusting member comprises a installation post that extends through the side panel, and a clamping portion is attached to the installation post.

8. The testing apparatus of claim 7, wherein the adjusting member further comprises a tightening portion moveably mounted on the installation post, and the tightening portion is configured to prevent the adjusting member from moving.

9. The testing apparatus of claim 1, wherein the support mechanism comprises a base and a securing member connected to the base, and the guiding member is secured to the securing member.

10. The testing apparatus of claim 9, wherein the securing member comprises a main securing plate and an assistant securing plate, and the assistant securing plate is moveably attached to the main securing plate, configured to secure the guiding member.

11. A testing apparatus comprising:
    a support mechanism comprising a base and a securing member substantially perpendicular to the base;
    a pushing device, moveably mounted on the securing member, comprising a guiding member, a driving member moveably attached to the guiding member, and a resilient component located between the guiding member and the driving member;
    a clamping device, attached to the driving member, configured for securing a product; and a guiding pipe attached to the pushing device;
    wherein the guiding pipe is configured to direct air into in the pushing device, for moving the driving member and the clamping device in a first direction, and deforming the resilient component, and when the air of the pushing device escapes, the resilient component biases the driving member and the clamping device in a second direction, that is opposite to the first direction.

12. The testing apparatus of claim 11, wherein a direction of the pushing device moving relative to the securing member is substantially perpendicular to that of the driving member moving relative to the guiding member.

13. The testing apparatus of claim 11, wherein the clamping device comprises a mounting shaft, and the driving member comprises a fixing pole engaged with the mounting shaft.

14. The testing apparatus of claim 13, wherein the driving member further comprises a connecting pole connected to the fixing pole, and a stopper piece secured to the connecting pole and the resilient component.

15. The testing apparatus of claim 14, wherein a diameter of the fixing pole is greater than that of the connecting pole.

16. The testing apparatus of claim 14, wherein a through hole, communicated with the guiding pipe, is defined in the guiding member, and the resilient component and the connecting pole are received in the through hole.

17. The testing apparatus of claim 13, wherein the clamping device further comprises a positioning member, the positioning member comprises a mounting panel substantially perpendicular to the mounting shaft and two side panels connected opposite sides of the mounting panel, and an adjusting member is moveably attached to each side panel.

18. The testing apparatus of claim 17, wherein the adjusting member comprises a installation post that extends through the side panel, and a clamping portion is attached to the installation post.

19. The testing apparatus of claim 18, wherein the adjusting member further comprises a tightening portion moveably mounted on the installation post, and the tightening portion is configured to prevent the adjusting member from moving.

20. The testing apparatus of claim 19, wherein the securing member comprises a main securing plate and an assistant securing plate, and the assistant securing plate is moveably attached to the main securing plate, configured to secure the guiding member.

* * * * *